May 8, 1962 W. KAUFMANN ET AL 3,033,758
PREPARATION OF LEVANS
Filed Nov. 15, 1957
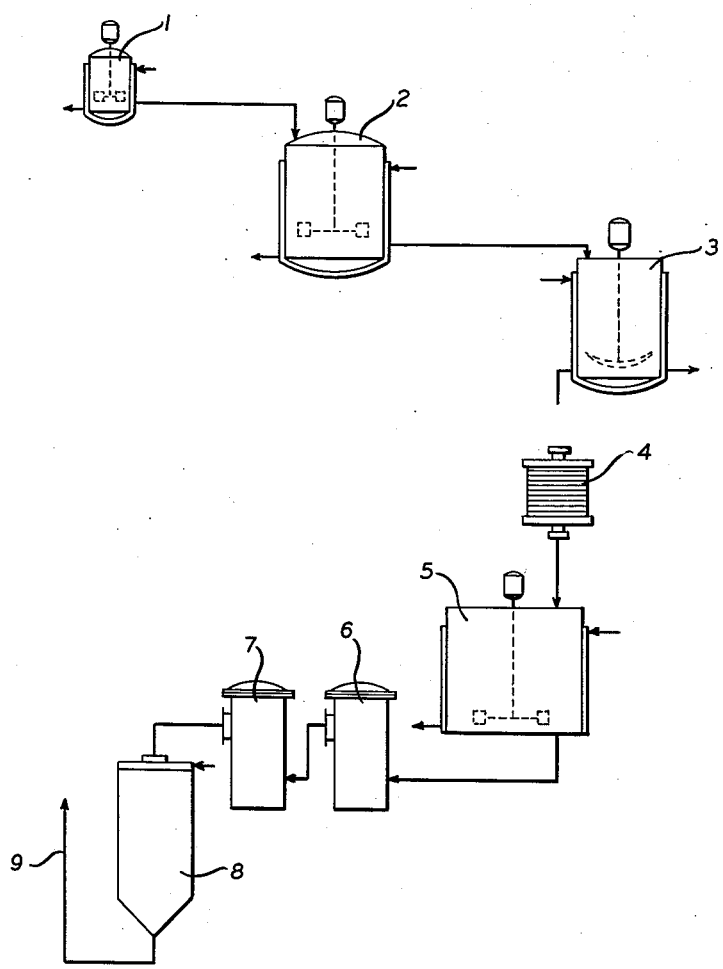
INVENTORS
Wilfried Kaufmann
Klaus Bauer
BY Heinrich Medick
ATTORNEYS.

United States Patent Office 3,033,758
Patented May 8, 1962

3,033,758
PREPARATION OF LEVANS
Wilfried Kaufmann and Klaus Bauer, Wuppertal-Elberfeld, and Heinrich Medick, Wuppertal-Vohwinkel, Germany, assignors to SchenLabs Pharmaceuticals Inc., New York, N.Y., a corporation of Delaware
Filed Nov. 15, 1957, Ser. No. 697,284
Claims priority, application Germany Nov. 23, 1956
9 Claims. (Cl. 195—31)

This invention relates to the preparation of levans having predetermined molecular weight and it has particular relation to the preparation of levans which are suitable for pharmaceutical applications, as well as thickening agents, substitute for blood, admixtures in tablets and the like, respectively.

The use of levans for pharmaceutical and technical applications depends in the first line on the molecular weight of the respective levan preparations.

In order to distinguish the levans of different molecular weights, in the following the terms "levans of low molecular weight," "levans for use as blood substitute" and "levans of high molecular weight" are used. These various types of levans are characterized herein by their solubility in methanol and their elimination from the blood circulation of rabbits.

The term "levans of low molecular weight" is used herein to denote levan products which—after the removal of dialyzable ingredients—are soluble in methanol of 70 to 80% at 20° C. 1.5 grams of such preparations, dissolved in 25 cm.³ of aqueous sodium chloride solution of 0.9%, are eliminated in rabbit tests almost quantatively within three hours after intravenous injection.

"Levans for use as blood substitute" are insoluble in methanol of 70–80% and they are eliminated in rabbit test to about 40% within 3 hours after injection and almost quantitatively after 120 hours after injection from the blood of the rabbit.

"Levans of high molecular weight" are insoluble in methanol of low concentration and they are eliminated in rabbit test to about 10–20% after injection from the blood of the test animal, 3 hours after injection.

"Levans for use as blood substitute" have a molecular weight of about 65,000. Within certain limits the relative viscosity in comparison with water can be used as an approximate indication of the size of the molecule, whereby, however, it should be taken into consideration that the viscosity of levans depends probably also on the shape of the molecule.

"Levans of low molecular weight" and "levans of high molecular weight" can be used as thickening agents, admixtures to tablets and the like.

It has been known that in order to prepare relatively uniform fractions of levan, to the levansucrase-sucrose-mixture so-called "primer levans" have been added (see Appl. Microbiology 3, 321–333, 1955). Such "primer levans" are levans of varying, but defined molecular weight, and they have been used as fructosyl acceptors. Furthermore, it is possible to obtain, within certain limits, levans of higher or lower molecular weight by variation of the pH, the enzyme concentration, sucrose concentration, and the temperature of the reaction mixture. However, by using these processes it is not always possible to obtain a levan preparation having a desired predetermined molecular weight, in useful yield.

It has now been found that the biosynthesis of levan can be directed in such a manner that predominantly levans of the desired molecular size are formed by proceeding according to the present invention in the manner described hereinafter. It is thereby possible to direct the reaction to the recovery of levans of either low, medium, or high molecular weight.

It has been found that the levan-synthetizing ferment—i.e. the levan sucrase—is capable of being adsorbed by various materials and of forming levan in this condition in the presence of sucrose and that the adsorptive bond of the ferment can be loosened or abolished by the action of inorganic and organic ions.

If the adsorbing agent is present in excess so that it adsorbs the ferment almost quantitatively, a levan of extremely high molecular weight is obtained.

By the use of unadsorbed levan sucrase, levan of very low molecular weight is obtained.

In order to produce levans having a molecular weight suitable for use as blood substitute, it is necessary that only a portion of the levan sucrase be adsorbed. This is attained either by reducing the amount of adsorbent materials or increasing the concentration of the ions.

Polysaccharides intended to be used as blood substitute must meet the highest requirements with regard to purity. By consequent application of colloidochemical processes it is possible to purify the levan produced according to the present invention to such an extent that all carriers of undesired biological reactions are removed. As examples of such products, in the first line the following have to be mentioned: pyrogenic substances, antigens, non-specific nitrogen-containing compounds, and heavy metals, etc. A solution of 6.0% of pure levan in Tyrode's-solution or in physiological sodium chloride solution, is tolerated without any reaction by the following test animals: dog, cat, rabbit, guinea pig, rat, and mouse.

The materials which are capable of adsorbing levan sucrase may be of the most varied character. It has been found that freshly precipitated calcium phosphate-gel is particularly suitable in carrying out the present invention. From the practical point of view, it is important that complex denatured albuminous substances, for example, the substances which separate upon heating from neutralized corn steep water, have a good adsorption capacity for levan sucrase. Tuned amounts of this denatured albumen in the nutrient solution can be easily obtained by filtering off part of the corn steep water after a separate sterilization.

It is possible to carry out the process of the present invention either on growing cultures of micro-organisms which separate levan sucrase, or in cell-free enzyme solutions. From the practical point of view, it has to be taken into consideration that in growing culture solutions of levan-forming micro-organisms complex and permanently changing reaction conditions are present.

EXAMPLE 1

A nutrient solution of the following composition is sterilized at 110° C. for 40 minutes:

Corn steep water of 1% (referred to dry substance) is adjusted with KOH to a pH of 6.8–7.0 prior to the preparation of the nutrient solution, heated to 120° C. for 20 minutes in order to denature albumin, and filtered after cooling through Seitz-clearing layers:

Solution A (16 Liters)

Corn steep water of 1% (referred to dry substance) is adjusted with KOH to a pH of 6.8–7.0.

Solution B (4 Liters)

Cane sugar _____ kilograms__ 2.0
Magnesium sulfate _____ grams__ 20.0
Secondary potassium phosphate _____ do____ 30.0
Ammonium sulfate _____ do____ 30.0

This sterilized nutrient solution (made up of the 16 liters of solution A, 4 liters of solution B, the cane sugar and salts) is inoculated after cooling with a suspension of *Bacillus subtilis*. After inoculation, 1% of $CaCO_3$ is added in form of a 50% sterile suspension in water. After 16 hours' cultivation, under aeration, at 28.5° C., a non-sterile addition of 2.0 kilograms of dry cane sugar takes place and the pH of the culture which has decreased to 5.4–5.6 is maintained from now on at 6.3–6.6 by frequent additions of Na$_2$CO$_3$ solution of 25%. After cultivation for 23 hours a further amount of 3.0 kilograms of cane sugar is added. After cultivation for a total period of 39 hours, fermentation is terminated.

The resulting culture is filtered through kieselguhr and the levan is recovered in pure condition according to conventional methods and dried.

The relative viscosity (based on water) of a 6% solution of this preparation, in sodium chloride solution of 0.9%, at 21° C., amounted to 5.2.

25 cm.$^3$ of this solution were administered by intravenous injection to a rabbit. Three hours after the injection, 40% of the total amount of injected levan was eliminated from the blood stream.

In this example, the substances which separate upon heating solution B are present as levan sucrase-adsorbing agents and amount to 0.16% of solution B (and therefore 0.032% of solution A+solution B).

EXAMPLE 2

These steps are similar to those described in the above Example 1, except that 20 liters of solution B is used instead of 16 liters of solution A and 4 liters of solution B.

The relative viscosity (based on water) of a 6% solution of this preparation in a sodium chloride solution of 0.9% at 21° C. amounted to 19.1 and the viscosity of a 3% solution in a sodium chloride solution of 0.9% amounted to 4.7.

50 cm.$^3$ of said 3% solution were intravenously injected to a rabbit. 3 hours after the injection, 16% of the total amount of injected levan was eliminated from the blood stream.

EXAMPLE 3

The steps are similar to those described in the above Example 1, except that 20 liters of solution A are used instead of 16 liters of solution A and 4 liters of solution B.

The relative viscosity (based on water) of a 6% solution of this preparation in sodium chloride solution of 0.9%, at 21° C., amounts to 3.0.

25 cm.$^3$ of this solution were intravenously injected to a rabbit. 3 hours after the injection 72% of the total amount of injected levan was eliminated from the blood stream.

EXAMPLE 4

1 liter of cell-free levan-sucrase-containing filtered culture of *Bacillus substilis*-enzyme solution is stirred for about 10 minutes with 200 cm.$^3$ of centrifuged, freshly precipitated calcium phosphate gel, which has been washed by repeated centrifuging and re-suspending in water. The suspension thus obtained is again centrifuged, the supernatant liquid is discarded and the precipitate is re-suspended in 1 liter of water. In this suspension 300 grams of cane sugar are dissolved and the resulting product is kept at 29° C. for 20 hours. The reaction mixture which has become highly viscous due to the formation of levan is further processed to dry levan in a manner similar to that used in processing the culture solution in the above Example 1.

The relative viscosity (based on water) of a 0.3% solution of this preparation in a sodium chloride solution of 0.9%, at 21° C., amounts to 7.7.

50 cm.$^3$ of a 2% solution of the product according to this example, in sodium chloride solution of 0.9%, were intravenously injected to a rabbit. 3 hours after the injection, 11% of the total injected levan was eliminated from the blood stream.

EXAMPLE 5

The process is carried out as in the above Example 4. However, into the initial mixture 50 grams of NaCl are additionally introduced. A reaction mixture of relatively low viscosity is formed, which is processed to dry levan in the manner described in the above Example 1.

The relative viscosity (based on water) of a 6% solution of this preparation in NaCl-solution of 0.9% at 21° C. amounted to 3.8.

25 cm.$^3$ of this solution were intravenously injected to a rabbit. 3 hours after the injection, 69% of the total injected levan was eliminated from the blood stream.

EXAMPLE 6

In 1 liter of the enzyme solution as used in the above Example 4, 40 cm.$^3$ washed, centrifuged calcium phosphate gel are suspended and in the resulting suspension 300 grams of cane sugar are dissolved. The mixture is kept at 29° C. for 20 hours. The reaction mixture is processed to dry levan in the same manner as the culture solution in the above Example 1.

The relative viscosity (based on water) of a 6% solution of this preparation in NaCl-solution of 0.9% amounts to 4.9 at 21° C.

25 cm.$^3$ of this solution were intravenously injected to a rabbit. 3 hours after the injection, 46% of the total injected levan was eliminated from the blood stream.

EXAMPLE 7

In 1 liter of enzyme solution, 300 grams of cane sugar are dissolved, without further admixtures. The reaction mixture, which is of rather low viscosity, is processed to dry levan in the same manner as the culture solution in the above Example 1.

The relative viscosity (based on water) of a 6% solution of this preparation in NaCl solution of 0.9% at 21° C., amounts to 2.9.

25 cm.$^3$ of this solution were intravenously injected to a rabbit. 3 hours after the injection, 72% of the total injected levan was eliminated from the blood stream.

EXAMPLE 8

A fermentation charge is treated in the manner described in the above Example 1, but in a batch of 200 liters instead of 20 liters. After finishing fermentation, to the culture solution an equal volume of methanol is added so that the total volume of the liquid amounts to about 400 liters. This liquid is stirred with about 10 liters of a suspension obtained by suspending 1278 grams (referred to dry weight) of centrifuged freshly precipitated calcium phosphate gel which has been washed by repeated centrifuging and re-suspension and the resulting liquid is filtered over a kieselgur filter. The resulting clear solution is now gradually mixed under stirring with additional amounts of methanol until precipitation by the methanol is completed. The precipitate is separated, dissolved in 200 liters of water and freed from salt by subsequent treatments over a cation-exchanger and an anion-exchanger. From the solution thus freed from ions, the levan is recovered as a white dry powder by spray-drying or by precipitation with methanol. The process of this example is illustrated in the appended drawing.

60 grams of the levan thus obtained are made up to 1 liter with Tyrode's solution. After dissolution, the resulting solution is sterilized.

The relative viscosity of this solution (based on water) amounted to 4.8 at 21° C. 25 cm.$^3$ of this solution were intravenously injected to a rabbit. Three hours after the injection, 38% of the total amount of injected levans was eliminated from the blood stream.

The appended figure diagrammatically illustrates the process described in the above Example 8. The inoculated mixture is passed from culture vessel 1 into the fermentation vessel 2. From the latter the culture solution is passed to vessel 3 after fermentation in vessel 2 has been completed. In vessel 3 the mixture is stirred with calcium phosphate gel and methanol. Subsequently the mixture is passed over the kieselgur filter 4 and introduced into precipitating vessel 5. It is precipitated by methanol and after removal of the supernatant liquid the sediment is dissolved in water in the same vessel. The solution is then passed over the ion exchangers 6 and 7 to the spray-drying apparatus 8, and finally the product is discharged at 9 and confectioned.

It will be understood from the above that this invention is not limited to the substances, proportions, conditions and other details specifically described above and can be carried out with various modifications. As examples of the adsorbents which can be used in addition to those specifically described above, the following are mentioned: activated bentonite, activated carbon, asbestos, cellulose-powder, kieselgur, silica-gel, Al-hydroxyde, starch, soya-powder, Mg-phosphate, La-ribonucleate. Any of these adsorbents can be used in the manner described in the above examples. Furthermore, the following organic and inorganic ions can be used, by way of example, for loosening or abolishing the bond between the adsorbents and levan sucrase: alkali, $Cl^-$, $SO_4^{--}$, $PO_4^{---}$, acetate-, lactate-, propionate-ions. The recovery of pure, dry levan from the levan-containing solutions prepared according to this invention can be carried out in any suitable manner, e.g. according to the process described in Appl. Microbiology 3, 321–333 (1955). The viscosities mentioned above were determined by an Ostwald-viscosimeter. The enzyme solution used in Example 7 had the same composition as that used in Example 4.

In order to prepare therapeutically applicable solutions, the levans obtained according to this invention are purified by conventional methods and then dissolved in blood-isotonic solutions. Levans of suitable molecular weight prepared according to this invention can be used with excellent results as starting materials for the preparation of heparinoids and they are subjected for this purpose to sulfatization according to conventional methods.

What is claimed is:

1. A process for the preparation of levans suitable for blood substitute purposes by the inter-action of *Bacillus subtilis* and enzymes formed by *Bacillus subtilis*, and cane sugar, in aqueous nutrient medium, comprising carrying out such interaction in the presence in said medium of levan sucrase-adsorbing agents in order to obtain levans suitable for said purposes and maintaining said agents present in said medium throughout the fermentation for the production of said levans as the principal product of the fermentation.

2. A process as claimed in claim 1, in which the nutrient medium contains ions for regulating the degree of adsorption of levan sucrase by the adsorbing agents, said ions being selected from the group consisting of alkali metal, alkaline earth metal, ammonium, $Cl^-$, $SO_4^{--}$, $PO_4^{---}$, acetate, lactate, and propionate ions.

3. A process as claimed in claim 1, in which the enzyme is levan sucrase.

4. A process as claimed in claim 1, in which the adsorbing agent is corn steep water.

5. A process as claimed in claim 1, in which the adsorbing agent is freshly precipitated calcium phosphate.

6. A process for the preparation of levans suitable for blood substitute purposes, by the inter-action of *Bacillus subtilis* and enzymes formed by *Bacillus subtilis*, and cane sugar, in aqueous nutrient medium, comprising carrying out such inter-action in the presence in said medium if substances which separate upon heating from neutralized corn steep water as levan sucrase-adsorbing agents and in the amount of at least about 0.032 weight percent of said medium, whereby the molecular weight of the levan produced is controlled.

7. A process as claimed in claim 6, in which the nutrient medium contains ions for regulating the degree of adsorption of levan sucrase by the adsorbing agents, and said ions being selected from the group consisting of alkali metal, alkaline earth metal, ammonium, $Cl^-$, $SO_4^{--}$, $PO_4^{---}$, acetate, lactate, and propionate ions.

8. A process for the preparation of levans suitable for blood substitute purposes, by the inter-action of *Bacillus subtilis* and enzymes formed by *Bacillus subtilis*, and cane sugar, in aqueous nutrient medium comprising carrying out such inter-action in the presence of said medium of calcium phosphate gel in the amount of at least about 40 cc. per liter of said medium, whereby the molecular weight of the levan produced is controlled.

9. A process as claimed in claim 8, in which the nutrient medium contains ions for regulating the degree of adsorption of levan sucrase by the adsorbing agents, and said ions being selected from the group consisting of alkali metal, alkaline earth metal, ammonium, $Cl^-$, $SO_4^{--}$, $PO_4^{---}$, acetate, lactate, and propionate ions.

References Cited in the file of this patent

UNITED STATES PATENTS

| | | |
|---|---|---|
| 2,673,828 | Koepsell et al. | Mar. 30, 1954 |
| 2,686,778 | Wimmer | Aug. 17, 1954 |
| 2,724,679 | Tsuchiya et al. | Nov. 22, 1955 |

FOREIGN PATENTS

| | | |
|---|---|---|
| 734,369 | Great Britain | July 27, 1955 |

OTHER REFERENCES

Advances in Carbohydrate Chemistry by Pigman et al., vol. 2, pp. 225 to 232 (1946), Academic Press Inc., New York, N.Y.

Applied Microbiology, 1955, vol. 3, pp. 321 to 330.

Industrial and Engineering Chemistry, April 1953, pp. 692 to 705; p. 699 relied on.